(12) United States Patent
Curry

(10) Patent No.: US 6,912,314 B1
(45) Date of Patent: Jun. 28, 2005

(54) REFORMATTING BINARY IMAGE DATA TO IMPROVE COMPRESSION USING BYTE ORIENTED COMPRESSION

(75) Inventor: Donald J. Curry, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,687

(22) Filed: Nov. 30, 1999

(51) Int. Cl.$^7$ .............................................. G06K 9/36
(52) U.S. Cl. ....................................... 382/232; 382/233
(58) Field of Search ................................ 382/232, 233, 382/244, 243; 358/1.15

(56) References Cited

U.S. PATENT DOCUMENTS 5,974,179 A * 10/1999 Caklovic ..................... 382/232

* cited by examiner

Primary Examiner—Yon J. Couso

(74) Attorney, Agent, or Firm—Oliff & Berridge, PLC

(57) ABSTRACT

A system and method for compressing and decompressing image data. The system and method reformats the data by interleaving, before it is sent to the compressor. The step of interleaving uses raster scan lines, taking N raster lines at a time and reformatting the data so that the first bit of the first N scan lines form a byte. This is continued for N bits. The data is then sent to a byte/text oriented compressor. After decompressing the data using byte/text oriented decompressors, the data is sent through an inverse binary data reformatter to un-interleave the data and return it to its original binary format.

26 Claims, 5 Drawing Sheets

REFORMATTING BINARY IMAGE DATA TO IMPROVE COMPRESSION USING BYTE ORIENTED COMPRESSION

BACKGROUND OF THE INVENTION

1. Field of Invention

This invention is directed to compressing digital data.

2. Description of Related Art

Data compression is required in data handling processes, where too much data is present for practical applications using the data. Commonly, compression is used in communication links to reduce the transmission time or required bandwidth. Similarly, compression is preferred in image storage systems, including digital printers and copiers, where "pages" of a document to be printed are stored temporarily in precollation memory. The amount of media space on which the image data is stored can be substantially reduced with compression. Generally speaking, scanned images, i.e., electronic representations of hard copy documents, are often large, and thus make desirable candidates for compression.

SUMMARY OF THE INVENTION

Byte oriented compression techniques include ZIP, Compress and LZW. These type of compression techniques rely on finding and encoding similar bytes. When presented with a binary image, which is typically stored as a raster of 1-bit pixels in a binary bit map, or as a raster of pixels, each having one or more bytes, in a byte map, a large context is required to discover the similar bytes on the next few scan lines.

This invention provides systems and methods that re-format the original raster image data to improve compression.

This invention separately provides systems and methods that take advantage of the vertical correlation that is typically present in a raster image when compressing that raster image.

In various exemplary embodiments, the systems and methods of this invention re-format the original raster image data. In various exemplary embodiments, the systems and methods interleave the bits from 8 adjacent raster scan lines. Accordingly, in a bit map raster image the first byte to be compressed includes the first 1-bit pixel of each of the first eight scan lines, the second byte includes the second 1-bit pixel of each of the first eight lines, etc. By re-formatting the raster data in this way, the systems and methods of this invention ensure that much of the vertical correlation of bits in the raster image is captured before the image is compressed using a byte-oriented compression technique.

The reordered original image data is then compressed using one of a variety of different types of compression techniques. The data is compressed and transferred to a storage facility or the like. When needed, the original image data can then be decompressed using the corresponding decompression technique re-ordered back into the original format, and sent to an image data sink.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
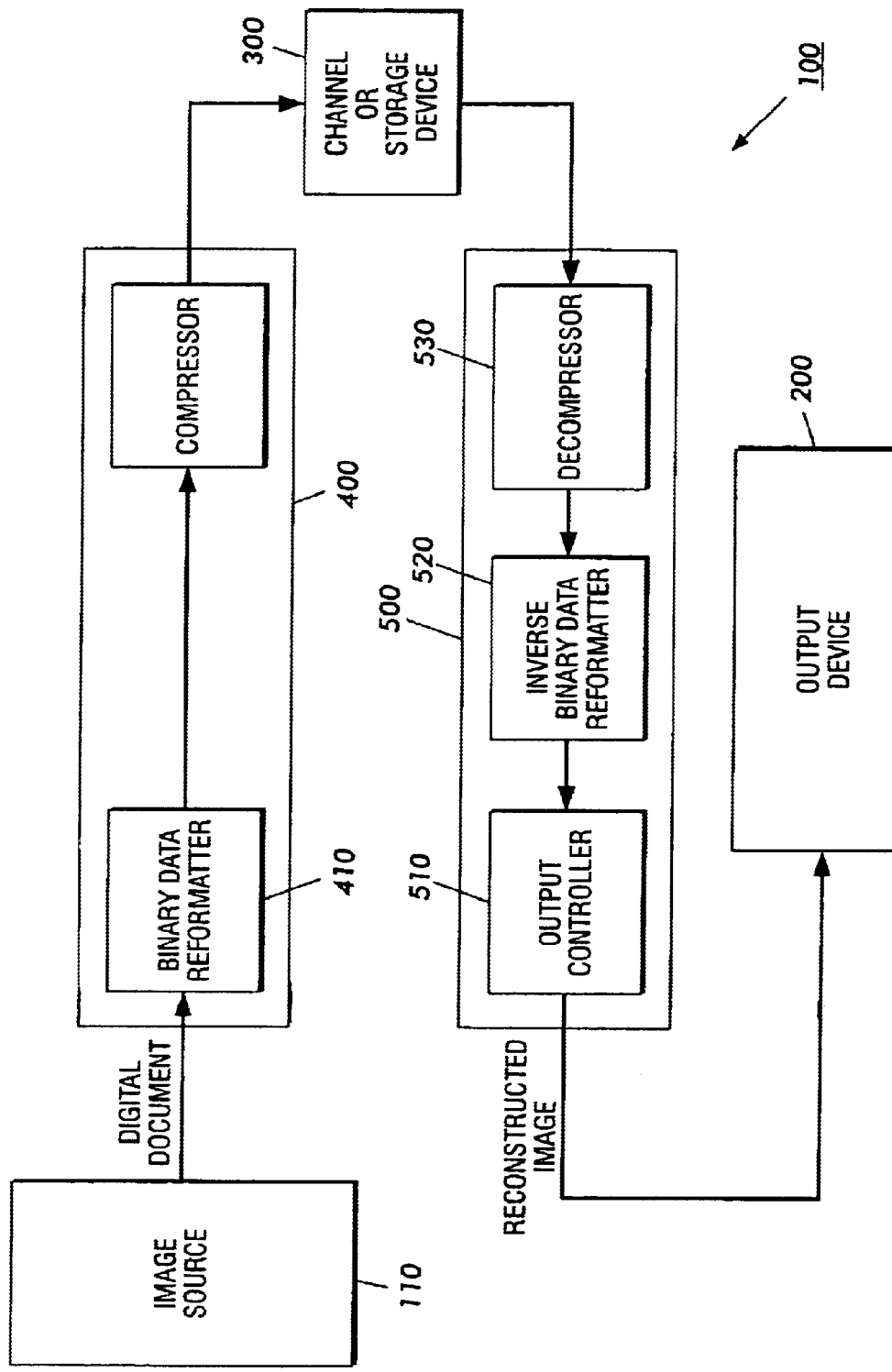
FIG. 1 is a generalized block diagram of one embodiment of a compression and decompression system according to this invention.

FIG. 1 shows one exemplary embodiment of a generalized functional block diagram of a compression and decompression system 100 according to this invention. The compression and decompression system 100 includes an image source 110 that may be any one of a number of different sources, such as a scanner, a digital copier, a facsimile device suitable for generating electronic image data, or a device suitable for storing and/or transmitting the electronic image data, such as a client or server of a network. The electronic image data from the image source 110 is provided to an encoder 400 of the compression and decompression system 100.

The encoder 400 incorporates all the necessary components to process the input image data and compress it. In particular, the encoder 400 includes a binary data reformatter 410 that reformats the original raster image data. The original raster image data, taken from the raster scan order, is interleaved to take advantage of the vertical correlation that is typically present.

The reordered original raster image data is then sent to a compressor 420 to be compressed. The compressor 420 can use any one of several byte-oriented data compression technique that can be used to compress the reformatted data These byte-oriented data compression techniques include ZIP, Compress, LZW and any other known or later-developed byte-oriented data compression technique.

Once compressed, the image data then is preferably transferred to the channel or storage device 300. The channel or storage device 300 can be either or both of a channel device for transmitting the compressed image data to the decoder 500 or a storage device for indefinitely storing the compressed image data until there arises a need to decompress the compressed image data. The channel device can be any known structure or apparatus for transmitting the compressed image data from a first apparatus implementing the encoder 400 according to this invention to a physically remote decoder 500 according to this invention. Thus, the channel device can be a public switched telephone network, a local or wide area network, an intranet, the Internet, a wireless transmission channel, any other distributed network, or the like.

Similarly, the storage device can be any known structure or apparatus for indefinitely storing compressed image data, such as a RAM, a hard drive and disk, a floppy drive and disk, an optical drive and disk, flash memory or the like. Moreover, the storage device can be physically remote from the encoder 400 and/or the decoder 500, and reachable over the channel device described above.

When the image is to be decompressed, in one exemplary embodiment, the data is then provided to and processed by the decoder 500. The decoder 500 incorporates all the necessary components to process the compressed data and to restore it to its original format. In particular, the decoder 500 includes a decompressor 530 that receives and decompresses the compressed image data from the channel or storage device 300, an inverse binary data reformatter 520 to un-interleave the decompressed data back into its original binary format and an output controller 510 that controls the decompressor 530 and the inverse binary data reformatter to form the decompressed image. Though the decoder 500 is shown in FIG. 1 as physically separate from the encoder 400, it should be understood that the decoder 500 and the encoder 400 may be different functional and/or structural aspects of a single physical device.

The output controller 510 sends the reconstructed image to the output device 200. It should be understood that the output device 200 can be any device that is capable of outputting or storing the decompressed image data generated according to the invention such as a printer, facsimile device, a display device, a memory, or the like.

Figure 2:
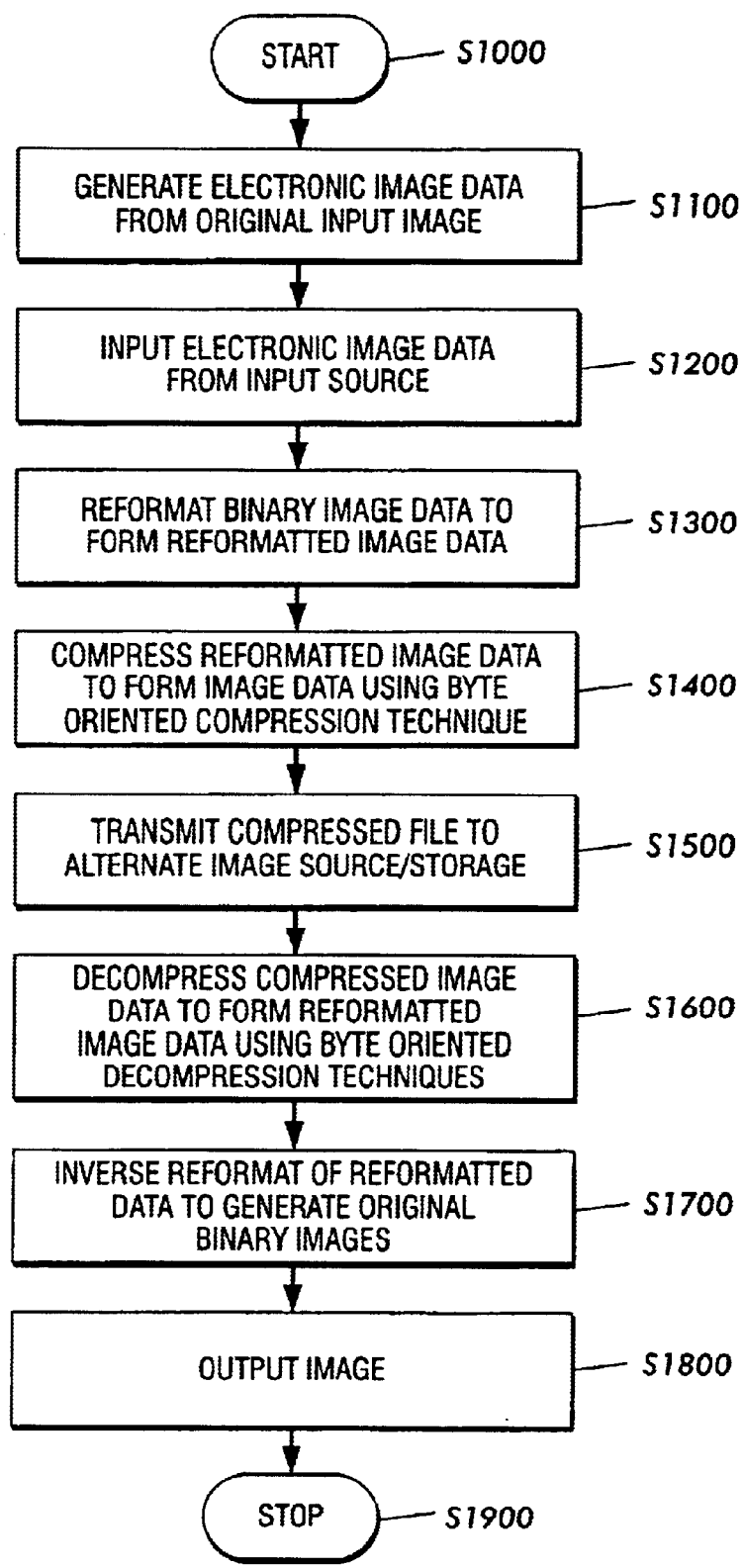
FIG. 2 is a flowchart outlining one exemplary embodiment of an image compression and decompression method according to this invention.

FIG. 2 is a flowchart outlining one exemplary embodiment of an image compression and decompression method according to this invention. Beginning in step S1000, control continues to step S1100, where electronic image data is generated from an original image. Then, in step S1200, the electronic image data is input from the image source. Control then continues to step S1300.

It should be appreciated that, while the flowchart of FIG. 2 shows generating the electronic image data as part of the process, this step is not necessarily needed. That is, while the electronic image data can be generated by scanning an original image, or the like, the electronic image data could have been generated at any time in the past. Moreover, the electronic image data need not have been generated from an original physical image, but could have been an original creation. Accordingly, if electronic image data of the image is already available to the image source, step S1100 can be skipped, with control continuing directly from step S1000 to step S1200. In step S1300, the binary image data is reformatted to form new reformatted image data. Then, in step S1400, compressed image data is generated from the reformatted image data using one of many byte-oriented compression techniques. Next, in step S1500, the compressed image data is transmitted, and possibly stored before being transmitted, to a device for decompressing the compressed image data. Control then continues to step S1600.

In step S1600, the compressed image data is decompressed using one of many corresponding byte-oriented decompression techniques. Next, in step S1700, the decompressed image data is inversely reformatted from its interleaved format back to its original binary image format. Next, in step S1800, the binary image data is output to a storage, display or memory device or the like. Then, in step S1900, the method ends.

Figure 3:
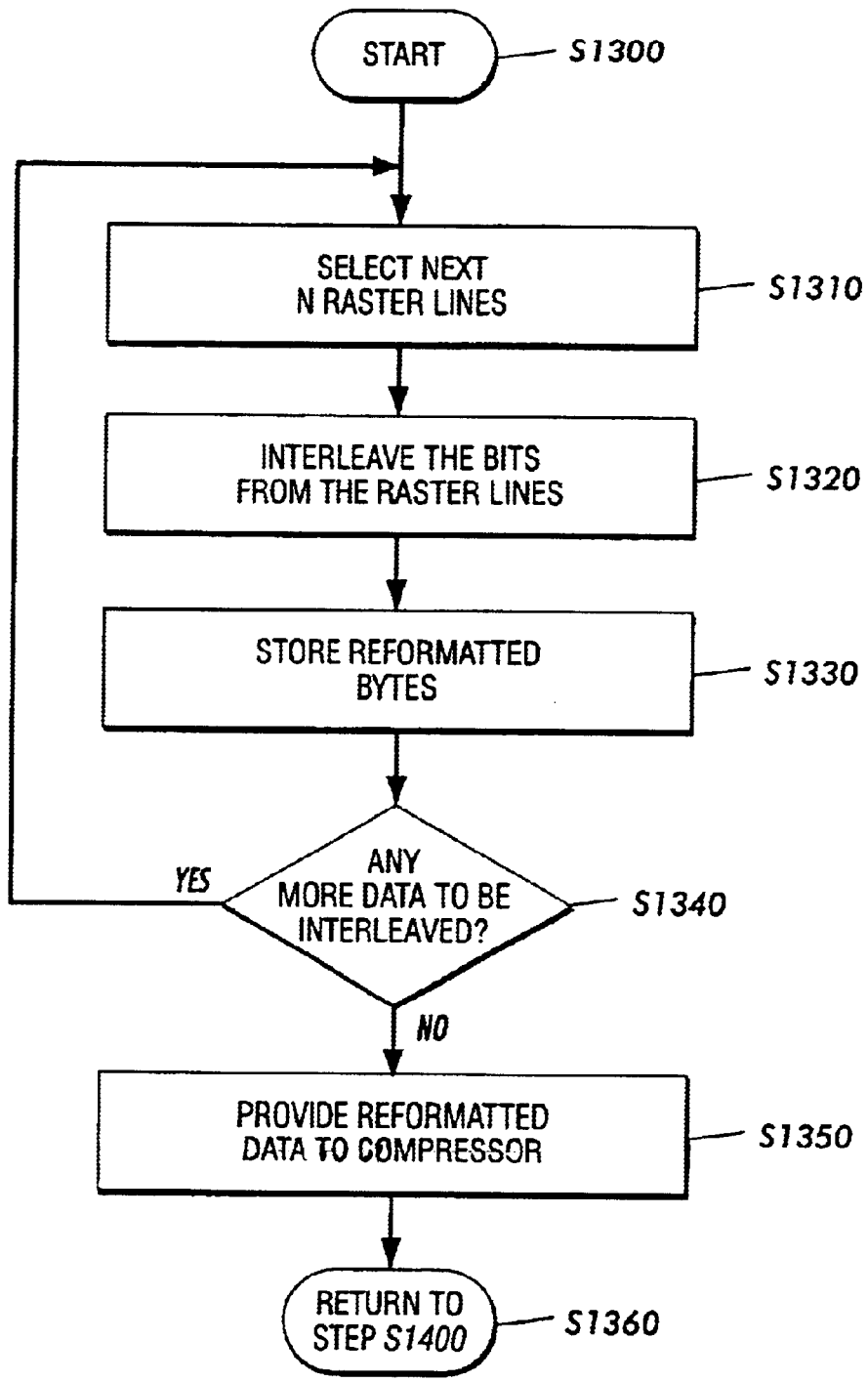
FIG. 3 is a flowchart outlining one exemplary embodiment of a method for reformatting of the original image data of step S1300.

FIG. 3 outlines in greater detail one exemplary embodiment reformatting of the image data of step S1300. Beginning in step S1300, control continues to step S1310, where the input data is selected. In step S1310, the first or next eight raster lines from the raster scan order are selected. Then, step S1320, the input data is reformatted by interleaving the eight bits of the current eight raster lines to form a byte. Next, in step S1330, the interleaved data is stored in a reformatted data buffer until all of the reformatted data is ready to be sent to the compressor for compression. Control then continues to step S1340.

In step S1340, a determination is made if there is any more data that needs to be interleaved. If there is data that needs to be interleaved, control jumps back to step S1310. If all the data has been interleaved, control continues to step S1350. In step S1350, the reformatted data or the reformatted data buffer is provided to the compressor for compressing. Thus, in step S1360, control returns to step S1400.

Figure 4:
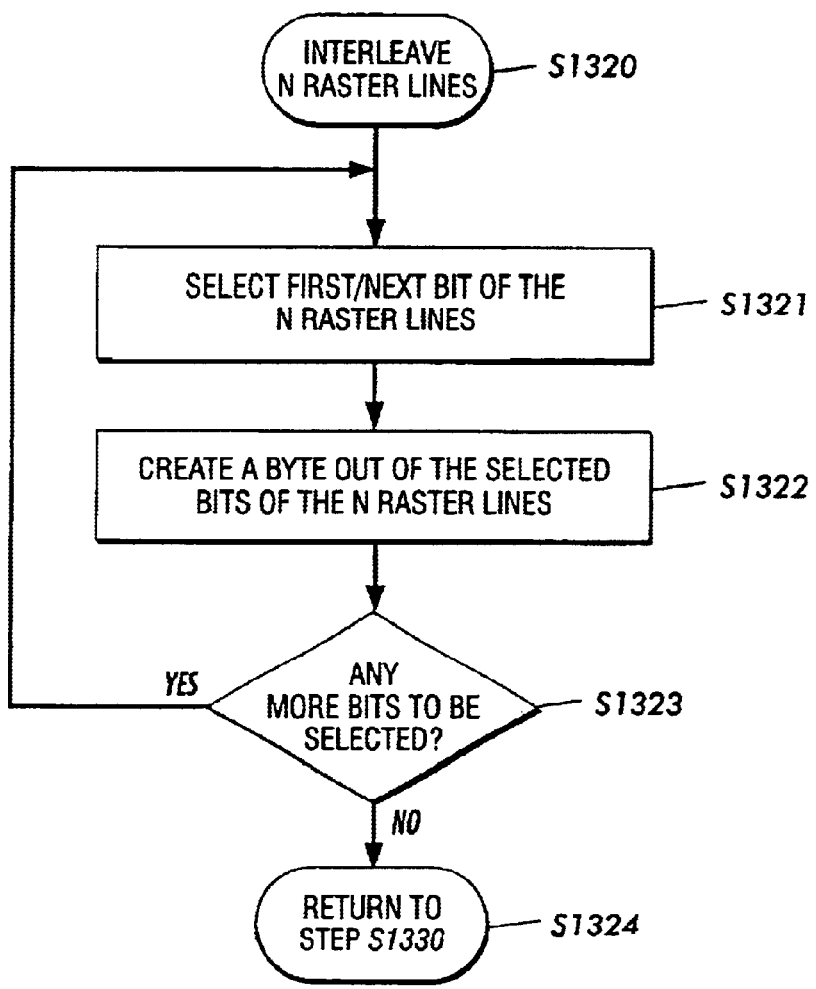
FIG. 4 is a flowchart outlining one exemplary embodiment of a method for re-formatting the original image data.

FIG. 4 outlines one exemplary embodiment of detail interleaving of the raster line bits of step S1320. Beginning in step S1320, control continues to step S1321, where the first bit of each of the eight current raster lines is selected. Next, in step S1322, a new byte is created out of the selected bits. In particular, the bits selected from the current eight raster lines are grouped together to form a byte. Then, in step S1323, a determination is made whether there are any more bits of the eight current raster lines that need to be selected. If there are any more bits to be selected, control jumps back to step S1321 and the next bit of each of the current eight raster lines are selected. If the last bits in the current eight raster lines have been selected, control continues to step S1324, where control returns to step S1330. Thus, the data of eight scan lines is interleaved to take advantage of the vertical correlation in the data.

Figure 5:
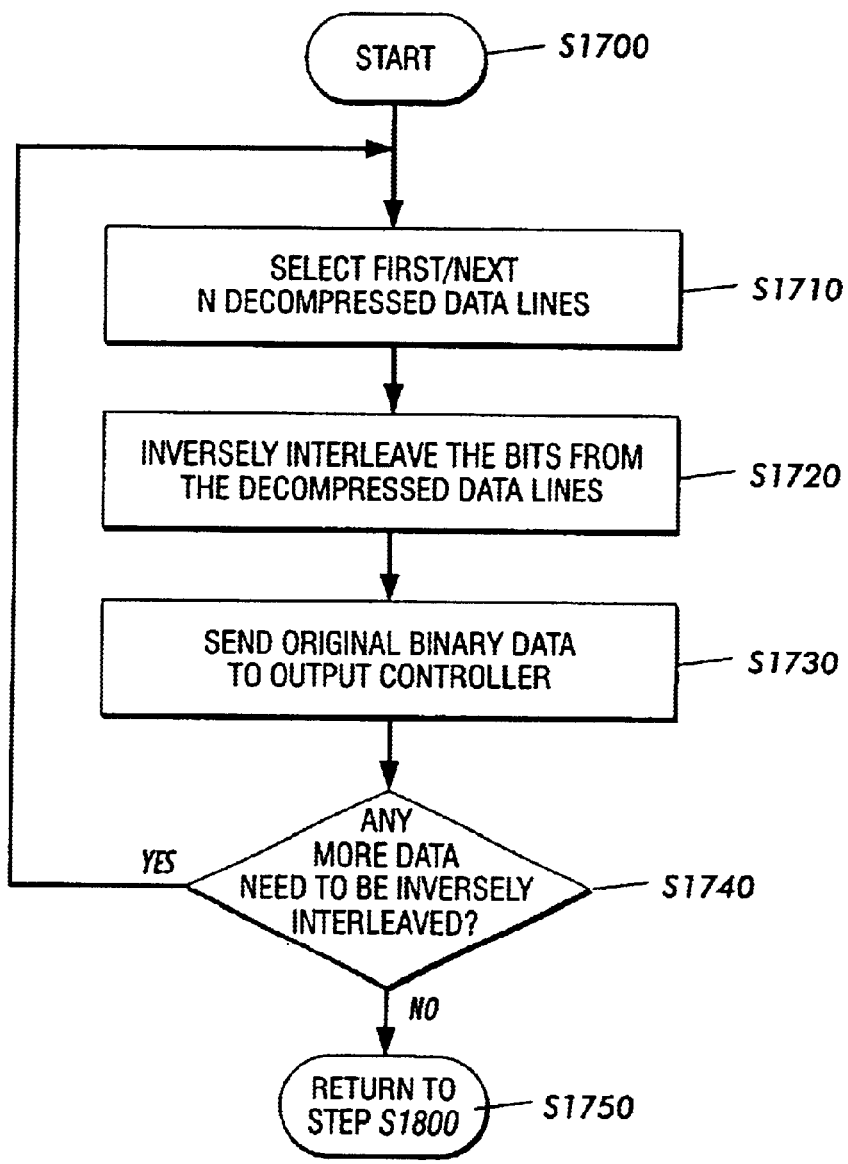
FIG. 5 is a flowchart outlining one exemplary embodiment of a method for inversely reformatting the reformatted data of step S1700.

FIG. 5 is a flowchart outlining one exemplary embodiment of inverse reformatting the interleaved data of step S1700. Beginning in step S1700, control continues to step S1710, where the first or next decompressed interleaved data bytes is selected. Then, in step S1720, the bits from the selected decompressed data bytes inversely interleaved to re-create the original binary raster image data. Next, in step S1730, the un-reformatted binary data bits are placed into the appropriate positions within the eight raster lines to which the bits of raster data belong. Control then continues to step S1740.

Next, in step S1740, a determination is made if there is anymore byte data that needs to be inversely interleaved. If there is, control jumps back to step S1710, If not, control continues to step S1750, where control returns to step S1800.

In various exemplary embodiments, the encoder 400 is implemented on a programmed general purpose computer. However, the encoder 400 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing step S1300 of FIGS. 2 and 3, can be used to implement the encoder 400.

Similarly, in various exemplary embodiments the decoder 500 is implemented on a programmed general purpose computer. However, the decoder 500 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing step S1700 of FIGS. 2 and 5, can be used to implement the decoder 500.

It should be appreciated that the compression systems and methods of this invention can use any set of byte-oriented compression and decompression techniques. The compression/decompression methods and systems of this invention can be used with any number of systems, including digital printers, digital copiers, scanners, and the like that need to provide compressed or decompressed images.

While this invention has been described in conjunction with the exemplary embodiments outlined above, it is evident that many alternatives, modifications and variations will be apparent to those skilled in the art. Accordingly, the exemplary embodiments of the invention may be made without departing from the spirit and scope of the invention.

What is claimed is:

1. A method for compressing an original image having a plurality of raster lines extending in a first direction, each raster line having a plurality of pixels extending in a second direction, comprising:

selecting a set of N raster lines extending in said first direction;

reformatting the image by successively interleaving only a single corresponding pixel of each of the N raster lines extending in said second direction; and compressing the reformatted interleaved data.

2. The method of claim 1, wherein successively interleaving only a single corresponding pixel of each of the N selected raster lines comprises:

selecting a next pixel along the second direction from each of the N selected raster lines;

forming at least one byte of reformatted interleaved data from the raster data of the selected pixels of the N selected raster lines; and storing the at least one byte.

3. The method of claim 1, wherein compressing the reformatted interleaved data compresses using at least one byte oriented compression technique to compress the reformatted interleaved data.

4. The method of claim 1, wherein the at least one byte oriented compression technique is at least one of LWZ, ZIP and Compress.

5. A method for decompressing compressed image data to form a restored image, comprising:

inputting compressed interleaved data;

decompressing the compressed interleaved data;

successively un-interleaving the decompressed interleaved data to create raster image data for the restored image by selecting at least one next byte of the decompressed interleaved data; and distributing each bit of the at least one byte to only a single corresponding pixels in each N raster lines of the restored image.

6. An image compression system that compresses an original image having a plurality of raster lines extending in a first direction, each raster line having a plurality of pixels extending in a second direction, the system comprising:

a binary data reformatter that reformats raster image data of the original image by successively interleaving only a single corresponding pixel of the original image extending in said second direction; and a compressor that compresses the interleaved raster image data.

7. The image compression system of claim 6 wherein the binary data reformatter successively interleaves only a single corresponding pixel of each of the N selected raster lines by:

selecting a next pixel along the second direction from each of the N selected raster lines;

forming at least one byte of reformatted interleaved data from the raster data of the selected pixels of the N selected raster lines; and storing the at least one byte.

8. The image compression system of claim 6, wherein the compressor is a byte-oriented compressor.

9. The image compression system of claim 6, wherein the compressor uses at least one of LWZ, ZIP and Compress.

10. An image decompression system that decompresses compressed image data to form a restored image, the system comprising:

a decompressor that decompresses the compressed interleaved data that was reformatted by successively interleaving only a single corresponding pixel of the data;

an inverse binary data reformatter that successively un-interleaves the interleaved data and forms a raster image data of the restored image by selecting at least one next byte of the decompressed interleaved data and distributing each bit of the at least one byte only to a single corresponding pixel in each of the N raster lines of the restored image; and an output controller that outputs the un-interleaved data to an output device.

11. The original image decompression system of claim 10, wherein the decompressor is a byte-oriented compressor technique decompressor.

12. A method of compressing and decompressing image data, comprising:

reformatting binary image data into reformatted image data by successively interleaving only a single corresponding pixel of each of the N selected raster lines;

compressing the reformatted image data;

decompressing the compressed reformatted image data; and reverse reformatting the decompressed image data into binary image data.

13. The method of claim 12, further comprising transmitting the compressed reformatted image data between the compressing and decompressing steps.

14. The method of claim 13, further comprising receiving the compressed reformatted image data between the transmitting and decompressing steps.

15. The method of claim 12, further comprising storing the compressed reformatted image data between the compressing and decompressing steps.

16. The method of claim 15, further comprising retrieving the compressed reformatted image data between the storing and decompressing steps.

17. A method for compressing and decompressing an original image having a plurality of raster lines extending in a first direction, each raster line having a plurality of pixels extending in a second direction, and decompressing compressed image data to form a restored image, comprising:

selecting a set of N raster lines extending in said first direction;

reformatting the image by successively interleaving only a single corresponding pixel of each of the N raster lines extending in said second direction;

compressing the reformatted interleaved data;

decompressing the compressed interleaved data; and successively un-interleaving the decompressed interleaved data to create raster image data for the restored image, the raster image data defining a plurality of raster lines extending in a first direction, each raster line having a plurality of pixels extending in a second direction.

18. The method of claim 17, wherein interleaving the pixels of the N selected raster lines comprises:

selecting a next pixel along the second direction from each of the N selected raster lines;

forming at least one byte of reformatted interleaved data from the raster data of the selected pixels of the N selected raster lines; and storing the at least one byte.

19. The method of claim 17, wherein compressing the reformatted interleaved data compresses using at least one byte oriented compression technique to compress the reformatted interleaved data.

20. The method of claim 17, wherein the at least one byte oriented compression technique is at least one of LWZ, ZIP and Compress.

21. The method of claim 17, wherein un-interleaving the decompressed interleaved data to the raster image data of the restored image, comprises:

selecting at least one next byte of the decompressed interleaved data; and distributing each bit of the at least one byte only to a single corresponding pixel in each of the N raster lines of the restored image.

22. An image compression and decompression system that compresses an original image having a plurality of raster lines extending in a first direction, each raster line having a plurality of pixels extending in a second direction, and decompresses compressed image data to form a restored image, the system comprising:

a binary data reformatter that reformats raster image data of the original image by successively interleaving only a single corresponding pixel of the original image extending in said second direction;

a compressor that compresses the interleaved raster image data;

a decompressor that decompresses the compressed interleaved data;

an inverse binary data reformatter that successively un-interleaves the interleaved data and forms a raster image data of the restored image by selecting at least one next byte of the decompressed interleaved data and distributing each bit of the at least one byte to only a single corresponding pixel in N raster lines of the restored image; and an output controller that outputs the un-interleaved data to an output device.

23. The image compression system of claim 22, wherein interleaving the pixels of the N selected raster lines, the system:

selects a next pixel along the second direction from each of the N selected raster lines;

forms at least one byte of reformatted interleaved data from the raster data of the selected pixels of the N selected raster lines; and stores the at least one byte.

24. The image compression system of claim 22, wherein the compressor is a byte-oriented compressor.

25. The image compression system of claim 22, wherein the compressor uses at least one of LWZ, ZIP and Compress.

26. The original image decompression system of claim 22, wherein the decompressor is a byte-oriented compressor technique decompressor.

* * * * *